United States Patent

Contaxis, III et al.

[19]

[11] Patent Number: 5,919,360
[45] Date of Patent: Jul. 6, 1999

[54] ADDITIVE DISPENSING APPARATUS

[75] Inventors: William Contaxis, III, Milford, Conn.; Robert A. Slovak, Incline Village, Nev.

[73] Assignee: Cuno, Inc., Meriden, Conn.

[21] Appl. No.: 08/906,819

[22] Filed: Aug. 6, 1997

Related U.S. Application Data

[60] Provisional application No. 60/024,003, Aug. 7, 1996.

[51] Int. Cl.$^6$ ........................................... B67D 5/00
[52] U.S. Cl. ................... 210/198.1; 210/205; 222/92; 222/105
[58] Field of Search ................. 210/198.1, 205; 222/92, 105

[56] References Cited

U.S. PATENT DOCUMENTS

| | | |
|---|---|---|
| 4,339,332 | 7/1982 | Jasperson . |
| 4,465,488 | 8/1984 | Richmond et al. ............ 604/414 |
| 5,102,010 | 4/1992 | Osgar et al. . |
| 5,526,956 | 6/1996 | Osgar . |
| 5,570,815 | 11/1996 | Ramsay . |

FOREIGN PATENT DOCUMENTS

| | | |
|---|---|---|
| 0 294 837 A2 | 12/1988 | European Pat. Off. . |
| 0 386 800 A1 | 9/1990 | European Pat. Off. . |
| 34 01 265 A1 | 7/1985 | Germany . |

*Primary Examiner*—Jay H. Woo
*Assistant Examiner*—Betsey J. Morrison
*Attorney, Agent, or Firm*—Cummings & Lockwood

[57] ABSTRACT

An additive dispensing apparatus for a fluid system is disclosed which includes a head having a body portion adapted and configured for fluid communication with the fluid system and having a flow path extending therethrough. A fluid inlet portion of the flow path defines a relatively high pressure region and a fluid outlet portion of the flow path defines a relatively low pressure region. A canister is operatively associated with the body portion and structure is provided for facilitating fluid communication between the fluid inlet portion and the interior of the canister. A collapsible container is disposed within the canister for containing a liquid additive for dispensement into the fluid system and structure is provided for facilitating fluid communication between the collapsible container and the fluid outlet portion, whereby the differential pressure between the interior of the canister and the interior of the collapsible container effectuates a proportional dispensement of liquid additive into the fluid system.

26 Claims, 10 Drawing Sheets

ADDITIVE DISPENSING APPARATUS

CROSS-REFERENCE TO RELATED APPLICATION

This application claims the benefit of U.S. Provisional application Ser. No. 60/024,003, filed Aug. 7, 1996.

BACKGROUND OF THE INVENTION

1. Field of the Invention

The subject invention relates to liquid dispensing apparatus, and more particularly, to a system for dispensing a metered quantity of liquid additives into a fluid flowing through a filtration system.

2. Background of the Related Art

Fluid filtration systems often require the dispensement of additives into the fluid flowing therethrough to alter or modify the characteristics of the fluid, i.e., to chemically react with the fluid so as to counteract certain deleterious effects of the fluid on the system, or supplement worthwhile characteristics that have deteriorated from the fluid over time.

For example, in an internal combustion engine, lubricating oil left untreated is often subject to deterioration caused by suspended materials such as combustion residues and particles produced by wear and abrasion of the moving engine parts. In addition, deterioration can occur from the exhaustion of preexisting additives in the engine oil. To counteract the deteriorative effects caused by the breakdown of engine oil, various mechanisms have been developed.

One such mechanism is disclosed in U.S. Pat. No. 4,075,097 to Paul which includes an oil filter having an enclosure containing a filter and a body of an oil soluble, relatively solid polymer having oil additives compounded therein. The polymer body is positioned such that it dissolves at a relatively linear rate so as to prevent concentrations of the additives during the service life of the filter. A similar mechanism is disclosed in U.S. Pat. No. 4,265,748 to Villani et al. which includes an oil filter having a tubular member containing a mixture of additives. The tubular member has at least one opening closed by a diaphragm made of a material soluble in the lubricant. In both of these prior art additive systems the additive is not introduced into the oil flow in a metered quantity proportional to the volume of oil flow through the system. In addition, there is no mechanism for preventing the dispersal of additive when the oil flow is temporarily discontinued.

Another example of a fluid system in which additives are used is the feedwater line of a convection steam boiler. In these systems, mineral scale inhibitors may be added to reduce or eliminate—depending on the mineral content in the fluid—scale in the boiler tubes. Deposits of scale in the system retard the flow of heat and raise metal temperatures. Reducing or eliminating boiler scale reduces boiler maintenance and downtime. In addition, the life of the boiler and its associated parts are prolonged. Additives may also be used in the feedwater to reduce dissolved oxygen. Since dissolved oxygen is the greatest factor in the corrosion of steel surfaces in contact with water, deaeration of makeup water and feedwater in boiler fluid systems is of utmost importance. Typically, partial deaeration is accomplished by either boiling or passing the fluid through a tray or spray-type deaerating heater. Thereafter, it is customary to supplement feedwater deaeration by adding a scavenging agent such as sodium sulfite or hydrazine to effectuate the complete removal of residual oxygen. Corrosion of the fluid system components can also occur from acidic conditions in the fluid. This can weaken the system's lines because of the loss of metal. pH altering agents may be added to counteract the acidic nature of the fluid.

Various methods have been employed to facilitate the addition of liquid additives to boiler feedwater and makeup water of fluid systems. One such method is the manual addition of additives into the makeup water storage tank of the fluid system. This method is problematic since it is difficult to completely mix the additive into the fluid and to ensure the correct proportion of additive to fluid as the proportion of additive to fluid changes each time the tank is topped off. Also, many fluid systems include utility-line feed water supplies, thereby eliminating the ability to utilize a storage tank to introduce additives in the manner described above.

Another method used in conjunction with line feed supplies is inline chemical injection systems. Exemplifying this approach is the system currently available under the tradename AQUAprep, catalog no. D2684, from Barnstead/Thermolyne Corporation, of Dubuque, Iowa. This device includes a canister having an inlet flow path and an outlet flow path and a rigid cartridge containing a quantity of chemical additive. A rigid additive flow restricter is provided at the top end of the dispenser in communication with the outlet flow path of the device. The flow restricter consists of a rigid plug constructed of a semi-porous material which has an axial bore extending therethrough of extremely small diameter. In use, as feed water flows through the device, additive is drawn from the dispenser, through the axial bore of the plug, and into the flow stream. This device has the disadvantage of not providing precise proportioning of the chemical additive. This is partly due to the partial mixing of feed water with the chemical additive in the cartridge and partly due to the inherent time-lag in the system caused by canister back-flow after periods of system inactivity. In addition, because the chemical concentration is determined by the restricter orifice, restricters must be experimented with during initial setup to obtain an acceptable initial flow rate.

SUMMARY OF THE INVENTION

The subject invention, described hereinbelow, eliminates the disadvantages exhibited in the prior art by utilizing a novel apparatus and method of dispensing predetermined proportions of liquid additives to the feed lines of fluid filtration systems.

In accordance with a preferred embodiment of the subject invention, the additive dispensing apparatus comprises a head having a body wherein a fluid flow path is provided. The fluid flow path includes an inlet portion defining a relatively high pressure region and an outlet portion defining at least in part a relatively low pressure region.

A detachable canister is operatively associated with the head. The canister includes an axial connector portion and may be readily removed for replacement using a quarter turn quick release mechanism. Fluid communication between the inlet portion of the fluid flow path and the interior region of the canister is accommodated by at least one radially extending aperture in the axial connector portion. Fluid communication between the interior region of the canister and the fluid outlet portion is accommodated by a plurality of axially extending apertures formed in the connector portion.

A collapsible container is disposed within the rigid container for containing liquid additive for dispensement into the fluid system. A feed tube provides fluid communication between the collapsible container and the outlet portion. The feed tube may include a check valve which only allows additive to egress from the collapsible container. Preferably, the check valve is in the form of a duckbill valve.

In accordance with the subject invention and as well understood by those skilled in the art, as liquid flows through the plurality of axially extending apertures into the outlet portion, a differential pressure is established between the interior region of the canister and the outlet portion. Because the collapsible container is in fluid communication with the outlet portion, its contents are at the same relatively low pressure as the fluid in the outlet portion and a differential pressure is established between the fluid inside the canister and the additive inside collapsible container. Consequently, the collapsible container responds to this differential pressure by collapsing, causing additive to be dispensed through the feed tube and into the fluid flow in the outlet portion. From the above, it can be understood that as the system flow rate changes, so does the differential pressure, and hence, the amount of additive fed into the fluid flow stream.

The apparatus also includes a quarter turn latching mechanism which facilitates ready replacement of the canister. The mechanism includes a spring loaded latch that slideably extends through a portion of the head body and protrudes down past the bottom surface of the body. A keyed attachment plate is secured to the bottom surface of the head body to retain the spring and latch. The keyed attachment plate includes a keyed aperture having two mating notches. Two attachment tabs are attached to the axial connector portion and a pair of latching grooves are formed into the top surface of the canister. The canister is removeably attached to the head body by first aligning the attachment tabs with the mating notches of the keyed aperture and passing the connector portion up into the head. Once the connector portion is seated in the head, the canister is rotated one-quarter turn. The canister is locked in place when the latch aligns with and extends into one of the latching grooves.

These and other features of the subject invention will be made more readily apparent to those having ordinary skill in the art from the following detailed description of the invention taken in conjunction with the accompanying drawings.

BRIEF DESCRIPTION OF THE DRAWINGS

So that those having ordinary skill in the art to which the subject invention appertains will more readily understand how to make and use the additive dispensing apparatus described herein, preferred embodiments of the invention will be described in detail hereinbelow with reference to the drawings wherein.

DETAILED DESCRIPTION OF THE PREFERRED EMBODIMENTS

Figure 1:
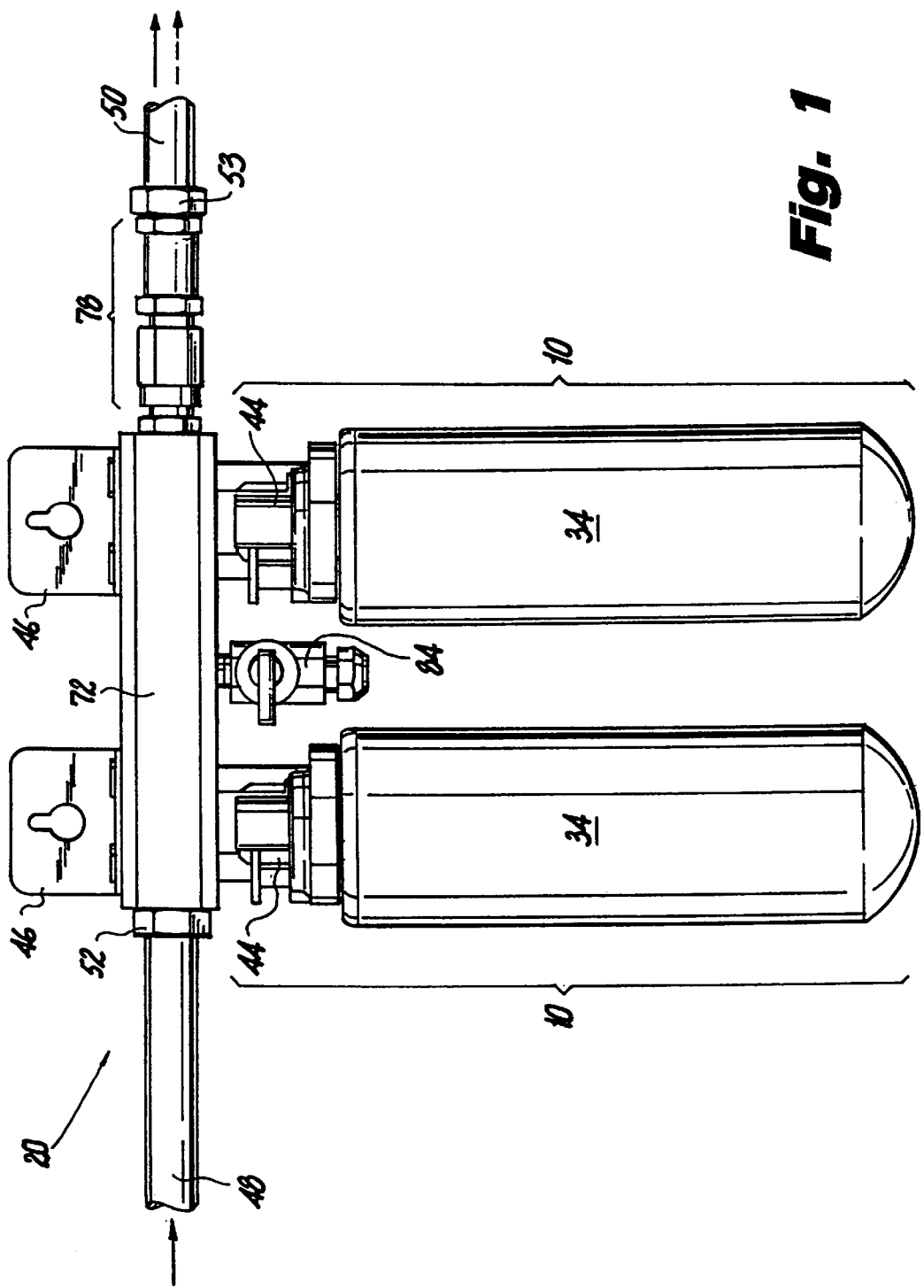
FIG. 1 is a side elevational view of a fluid system employing two of the additive dispensing apparatus of the subject invention arranged in series.
Figure 2:
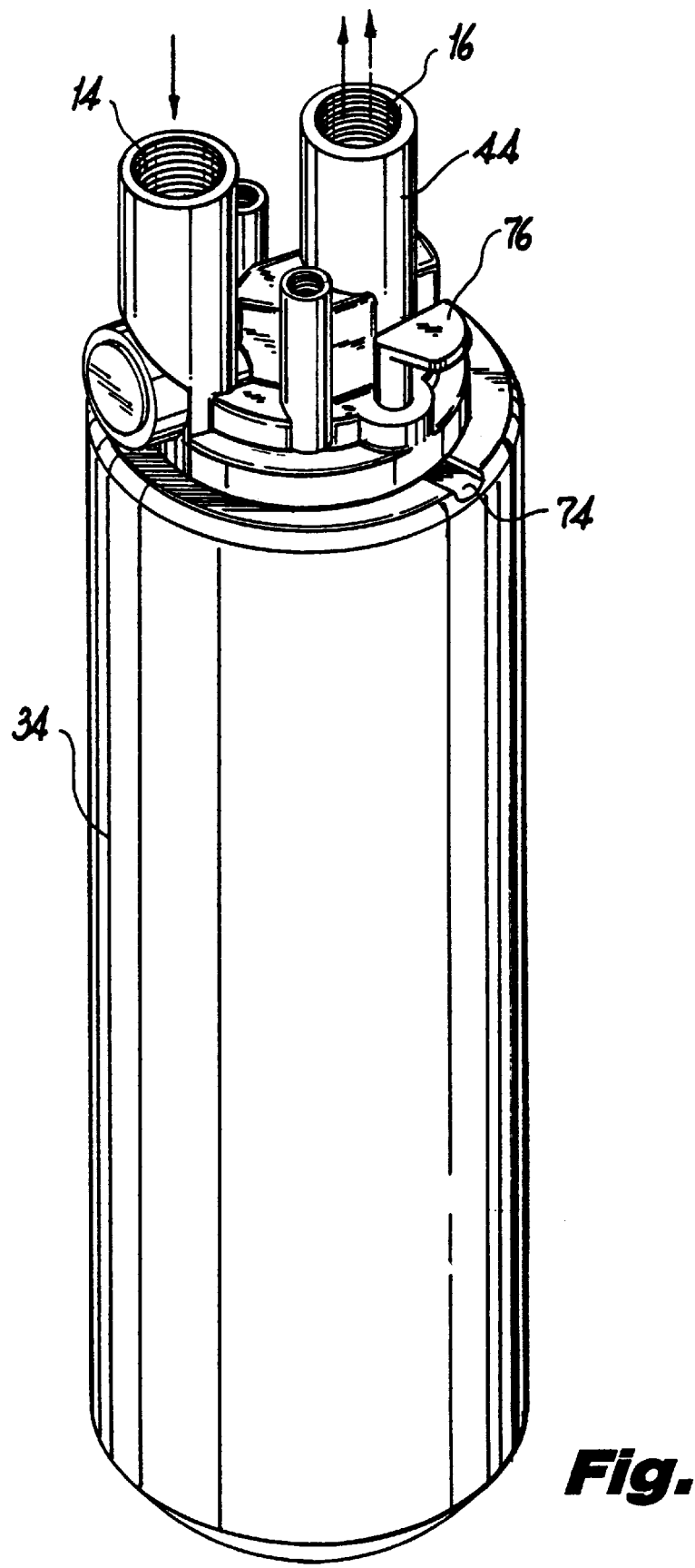
FIG. 2 is a perspective view of an additive dispensing apparatus constructed in accordance with a preferred embodiment of the subject invention.

Referring now to the drawings wherein like reference numerals identify similar structural elements of the subject invention, there is illustrated in FIG. 1 additive dispensing apparatus constructed in accordance the subject invention and each designated generally by reference numeral 10. Dispensing apparatus 10 are employed in a fluid system to enhance various characteristics of the fluid flowing therethrough such as, for example, its mineral and oxygen content, and pH. Having two such apparatus in a system as shown in FIG. 1 permits the addition of two additives. Additional apparatus may be added as required. Hereinunder, assemblies including several additive dispensing apparatus will be described as being arranged in series. However, as can be readily understood by those skilled in the art, the several apparatus may alternately be arranged in parallel. The arrangement chosen will depend on the application.

Referring now in detail to FIG. 1, fluid system 20 includes a head manifold 72 having angled supporting brackets 46 for attachment to a supporting structure such as a wall or column. A first tube connector 52 is threaded to the inlet side of the manifold 72 for communicating with an inlet tube 48. A check valve/flow regulator assembly 78 as well as a second tube connector 53 are attached to the outlet side of the manifold 72 for communicating with an attachment tube 50. Two additive dispensing apparatus 10 are in fluid communication with the head manifold 72. A flush valve 84 is attached to the manifold 72 allowing air to be flushed from a new cartridge 34 as well as system depressurization during maintenance.

Figure 4:
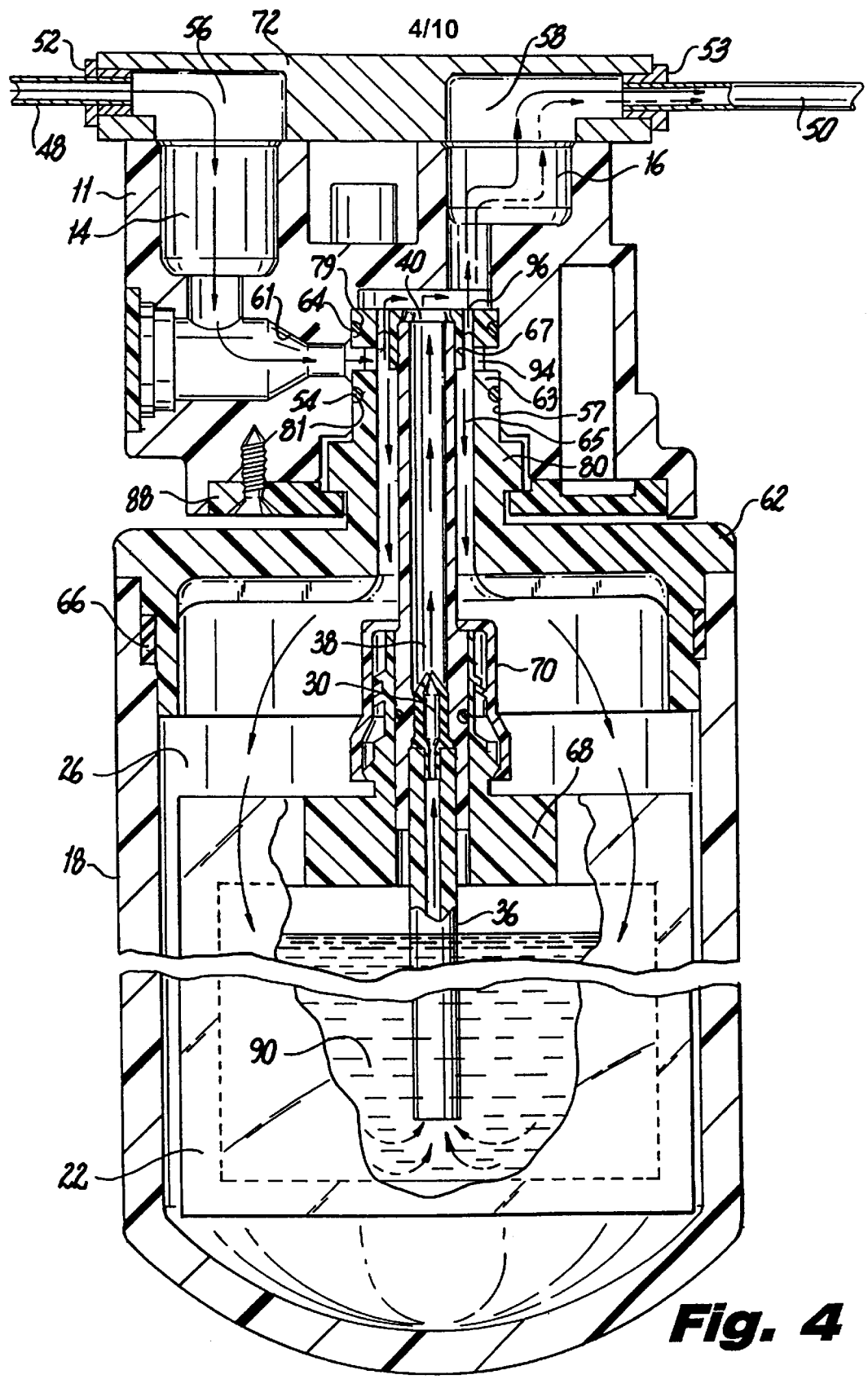
FIG. 4 is a side elevational view in cross-section of the apparatus shown in FIG. 2, communicating with a manifold of a fluid system and illustrating the fluid flow path therethrough.

Referring in particular to FIG. 4, a single head and additive dispensing apparatus is shown. Inlet tube 48 is sealingly connected to the first tube connector 52. The first tube connector 52 is threaded to a first side wall of the head manifold 72 using tapered pipe threads. The manifold 72 includes a first fluid passageway 56 extending therethrough to provide fluid communication between the first tube connector 52 and the bottom surface of the manifold. Similarly, the outlet tube 50 is sealingly connected to the second tube connector 53. The second tube connector 53 is threaded to a second side wall of the head manifold 72 using tapered pipe threads. The manifold 72 includes a second fluid passageway 58 that provides fluid communication between the second tube connector 53 and the bottom surface of the manifold. The second fluid passageway 58 extends through the manifold bottom surface proximate the first fluid passageway 56.

In operation, system fluid passes through the inlet tube 48, through the manifold 72, and into the dispensing apparatus 10. As will be described in greater detail below, the fluid is then treated by the addition of a liquid additive as it passes in parallel through both additive dispensing apparatus 10, returning to the manifold 72 therebetween. After passing through the second dispensing apparatus 10, the treated fluid returns to the manifold 72 and then to the fluid system through the outlet tube 50. As illustrated in the drawings which follow, directional arrows having solid shafts will indicate the system's primary fluid flow while arrows having dashed shafts will indicate the additive flow.

Referring now to FIGS. 2 through 5, additive dispensing apparatus 10 includes a head assembly 44 and a detachable canister assembly 34. These assemblies and the component parts thereof are made from substantially chemical resistant materials to assure the integrity of the device throughout its operational life. The head assembly includes a head body 11. Extending partially up from the bottom surface and formed in a recess in the bottom of the head body 11 is a stepped smooth-bore cylindrical passageway 57 having side and top walls. Extending partially down from the top surface of the body 11 is an inlet portion 14 that provides fluid communication between the top surface of the body 11 and the side wall of the cylindrical passageway 57. A chamfered shoulder 61 is formed in the inlet portion 14 to reduce its diameter as it intersects the cylindrical passageway 57. Also extending partially down from the top surface of the body 11 is an outlet portion 16 that provides fluid communication between the top surface of the body 11 and the top wall of the cylindrical passageway 57. The outlet portion 16 extends through the body 11 top surface proximate the inlet portion 14. The inlet portion 14, cylindrical passageway 57, and outlet portion 16 together form a flow path through the body 11.

Figure 3:
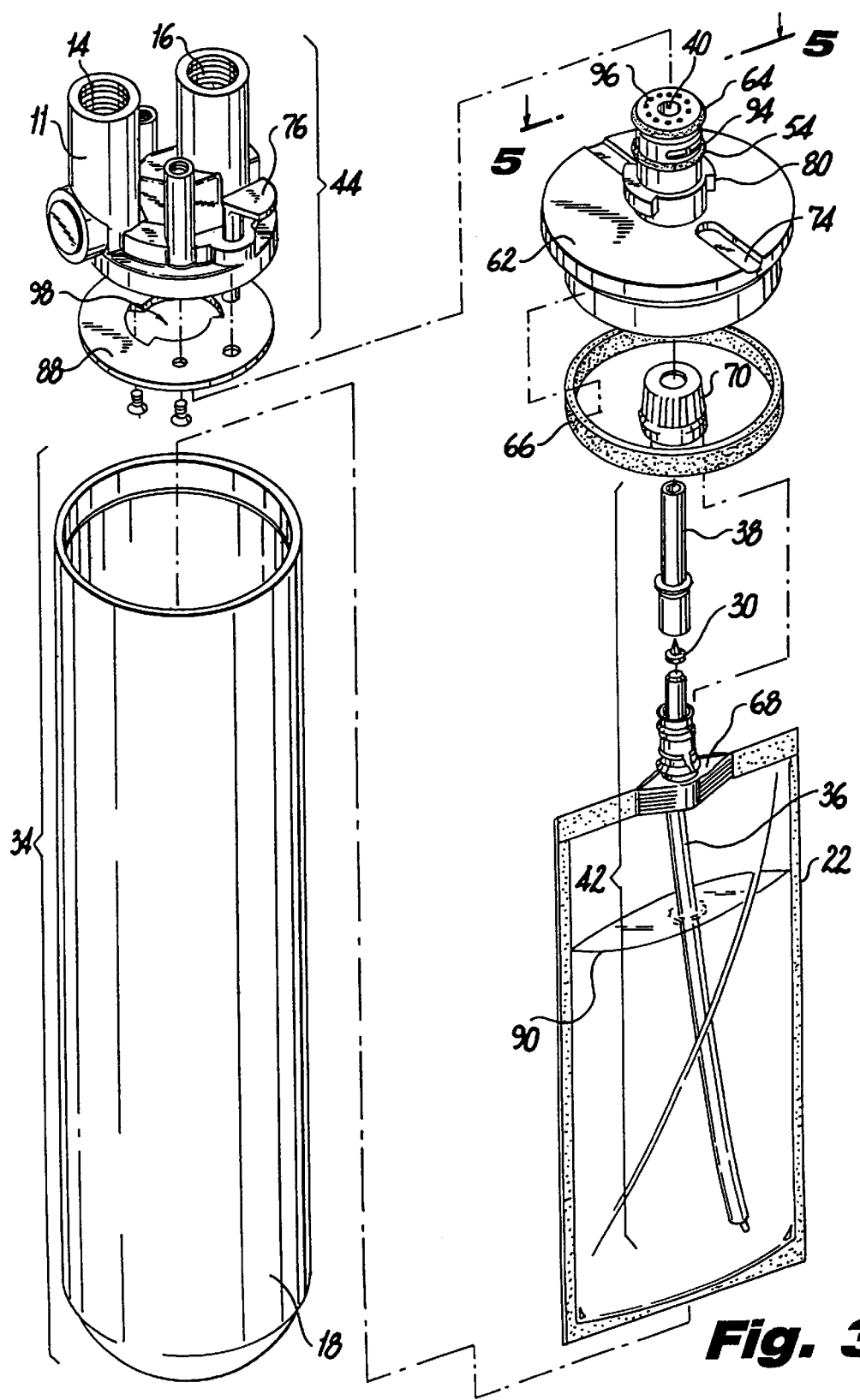
FIG. 3 is an exploded view of the apparatus of FIG. 2 with the parts separated for ease of illustration.

With continuing reference to FIGS. 3 and 4, the detachable canister assembly 34 includes a rigid cylindrical container 18 fused to a rigid container cap 62 with a fusible weld ring 66 through methods such as RF welding which are well known in the art. Extending from the top of the rigid container cap 62 is a cylindrical axial connector portion 63 having side and top walls. A cylindrical passageway 65 is formed concentrically within the axial connector portion 63 extending from the interior of the rigid container/cap assembly 18, 62 to the top wall of the axial connector portion. Fluid communication between the connector portion cylindrical passageway 65 and the exterior of the axial connector portion 63 is provided through two radially extending apertures 94 which pass through the side wall of the connector portion 63, a plurality of axially extending apertures 96 passing through the top wall of the connector portion 63, and a concentrically located axially extending feed tube aperture 40 which also passes through the top wall of the axial connector portion 63.

A first O-ring 64 is seated in a first radial groove 79 in the external wall of the axial connector portion 63 between the radially extending apertures 94 and top wall thereof. O-ring 64 prevents fluid flow between the inlet portion 14 and the outlet portion 16. A second O-ring 54 is seated in a second radial groove 81 in the external wall of the axial connector portion 63 just below the radially extending apertures 94. O-ring 54 ensures that fluid does not leak out of the fluid system. A concentrically located sleeve 67 is disposed adjacent the walls of the axially extending feed tube aperture 40 partially into the connector portion cylindrical passageway 65 for attachment of a feed tube assembly 42.

Enclosed within the rigid container/cap assembly 18, 62 is a collapsible container 22 which contains a given volume of a liquid additive 90. The collapsible container 22 is constructed in the form of a flexible bag defined by two sheets of polyethylene/nylon laminate which are sealed around the edges thereof by known means. Other materials well known in the art may be employed to construct the additive containing bag. A male-threaded adapter 68 is sealed within the upper edge of the collapsible bag to provide an attachment fitting. A lower feed tube 36 is press fit into an upper feed tube 38 trapping a duckbill-type check valve 30 therebetween and forming the feed tube assembly 42. The check valve 30 is oriented so that flow may progress only up through the feed tube assembly during operation. The upper feed tube 38 is sealingly connected to the adapter 68 with a female-threaded mating collar 70. The upper end of the upper feed tube 38 is press fit into the concentric sleeve 67.

Referring now to FIG. 3, there is illustrated a latch 76 which forms part of a quarter turn latching mechanism that slideably extends through an upper surface portion of the body 11 and protrudes down past the bottom surface of the body to facilitate the attachment of the detachable canister 34 to the head body 11. The latch is biased downward by a latch spring (not shown). Secured to the bottom surface and within the recess of the body 11 is a keyed attachment plate 88. The plate 88, which includes a keyed aperture 98, retains the latch 76 and latch spring to the head body 11. Two attachment tabs 80 attached to the lower side wall below the second O-ring 54 of the axial connector portion 63, and a pair of latching grooves 74 formed into the top surface of the rigid container cap 62, also form part of the quarter turn latching mechanism of apparatus 10.

Detachable canister 34 is removeably attached to the head assembly 44 with the quarter turn latching mechanism by first aligning attachment tabs 80 on the axial connector portion 63 with the mating notches of the keyed aperture 98 in the attachment plate 88 and passing the connector portion up through the plate. After the connector portion 63 is fully seated in the head 44, the canister 34 is rotated one-quarter turn. The container cap 62 is thereupon locked in place when the spring biased latch 76 aligns with and extends into one of the two latching grooves 74.

Figure 5:
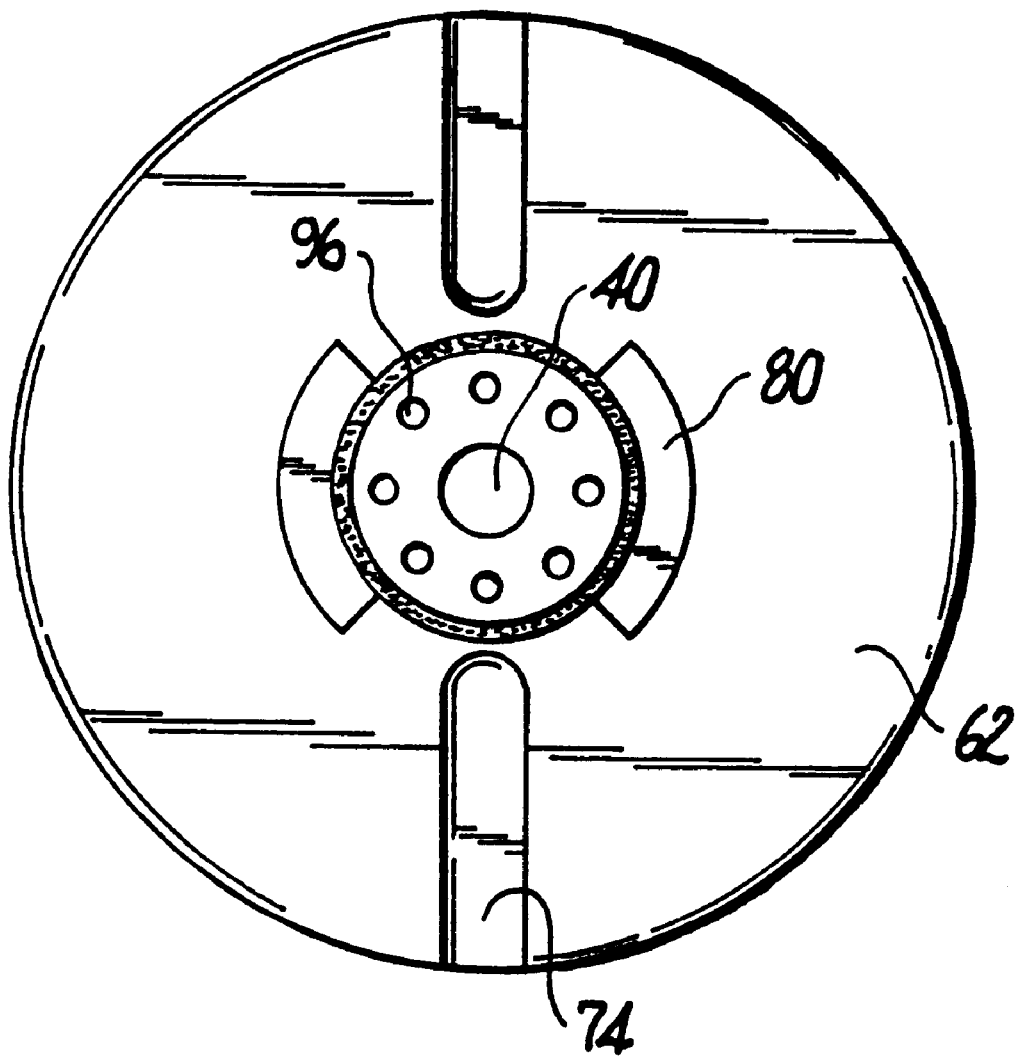
FIG. 5 is a top plan view of the rigid container as viewed along line 5—5 of FIG. 3 illustrating the container cap and axial flow ports formed therein.

Referring now to FIGS. 4 and 5, in operation, liquid additive 90 is dispensed into a fluid system in the following manner. Fluid flows from the inlet tube 48, through the first fluid passageway 56 of the manifold 72, and into the inlet portion 14 of the head body 11. The fluid then passes through the radially extending apertures 94 in the side wall of the axial connector portion 63 into the interior region 26 of the detachable canister 34. Fluid then travels through the plurality of axially extending apertures 96 in the top wall of the axial connector portion 63 and into the outlet portion 16 of the body 11. As will be described below, it is at this point where the liquid additive 90 is introduced into the fluid flow. The fluid then flows from the outlet portion 16 back to the manifold 72 through the second fluid passageway 58 and into the outlet tube 50 of the fluid system. If there are several additive dispensing systems, as illustrated, for example, in FIG. 1, the fluid will travel a similar path through each system, typically in series, however they may be arranged in parallel.

Significant to the functioning of the system is the pressure drop caused by the reduction in cross-sectional area in the flow path as the system fluid flows through the plurality of axial extending apertures 96. This pressure drop creates a relatively high pressure region upstream from the apertures 96 and a relatively low pressure region downstream from the apertures 96. Because of the proximity of the feed tube aperture 40 to the axial extending apertures 96, a pressure differential is established between the fluid in the interior region 26 of the canister 34 and the additive 90 in the collapsible container 22. With the pressure difference established, liquid additive 90 is expelled from the collapsible container 22 into the fluid stream through the feed tube assembly 42 and out the feed tube aperture 40.

During operation, the duckbill-type check valve 30 in the feed tube assembly 42 provides several advantages. It allows the collapsible container 22 to collapse as the liquid additive 90 is dispensed, and prevents fluid from back-flowing into the collapsible container. These attributes prevent the liquid additive 90 from being diluted, ensuring consistent additive flow when the fluid system is operated intermittently. The check valve also ensures that undiluted liquid additive instantly flows when the fluid system is turned on. It can be appreciated by one skilled in the art that the restrictive nature inherent in the feed tube assembly 42 can be changed to alter the feed rate of the liquid additive 90. For example, increasing the diameter of the feed tube or increasing the flexibility of the check valve would serve to increase the dispensing rate. The magnitude of the pressure differential can also be changed to alter the feed rate of the additive. For example, increasing the cross-sectional area of the plurality of axial extending apertures 96 will reduce the differential pressure thereby reduce the feed rate.

It should be highlighted that even though several reductions in cross-sectional area are shown in the flow path—at each point there being a pressure drop—it is only necessary for the invention to have one reduction in the flow path. However, it is essential to the operation of this invention that the region inside the detachable canister 34 be located upstream from the reduction in flow path cross-sectional area, and that the feed tube outlet 40 be located downstream from the reduction in flow path cross-sectional area, so there is established a differential pressure between the fluid immediately inside the rigid container 18 and the additive within the collapsible container 22.

Readily apparent to one skilled in the art is that it is unnecessary for the practice of this invention that the differential pressure drop be created within the immediate vicinity of the collapsible container as described herein. The development of the differential pressure, for example, can also be created through a flow nozzle inserted into the fluid system line with the additive dispenser—including the rigid container, collapsible container, and appropriate connections—being attached more remotely.

Figure 6:
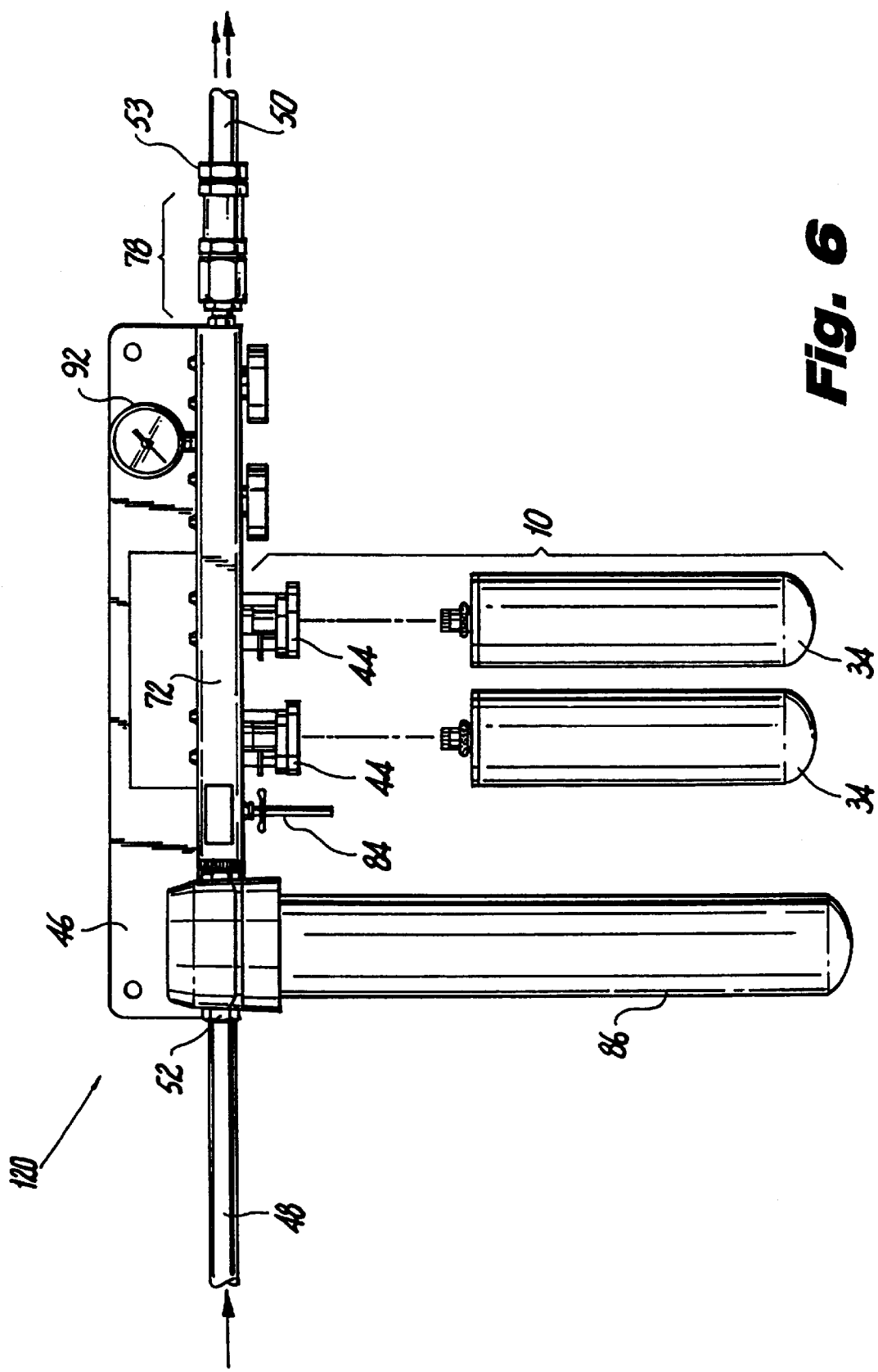
FIG. 6 is a side elevational view of a fluid system employing two of the additive dispensing apparatus of the subject invention and a filter cartridge, all mounted on a supporting structure, and each arranged in series.

Referring to FIG. 6, there is illustrated an alternate assemblage 120 including components constructed in accordance with a preferred embodiment of subject invention. Included are two additive dispensing apparatus 10 communicating with a manifold 72 in a manner similar to the system described above; a filter cartridge 86 for the removal of particulates, oil, and other matter suspended in the system fluid; and a gauge 92 for monitoring line pressure in the system. Utilizing the apparatus of subject invention in such an arrangement has considerable advantage. Particularly, it allows for the conditioning of the system fluid in a convenient location as opposed to having the components dispersed throughout the system. This reduces maintenance time and enhances the modularity of the system. In addition, because the components are all linked to a single manifold, the number of possible leak points is reduced.

Figure 7:
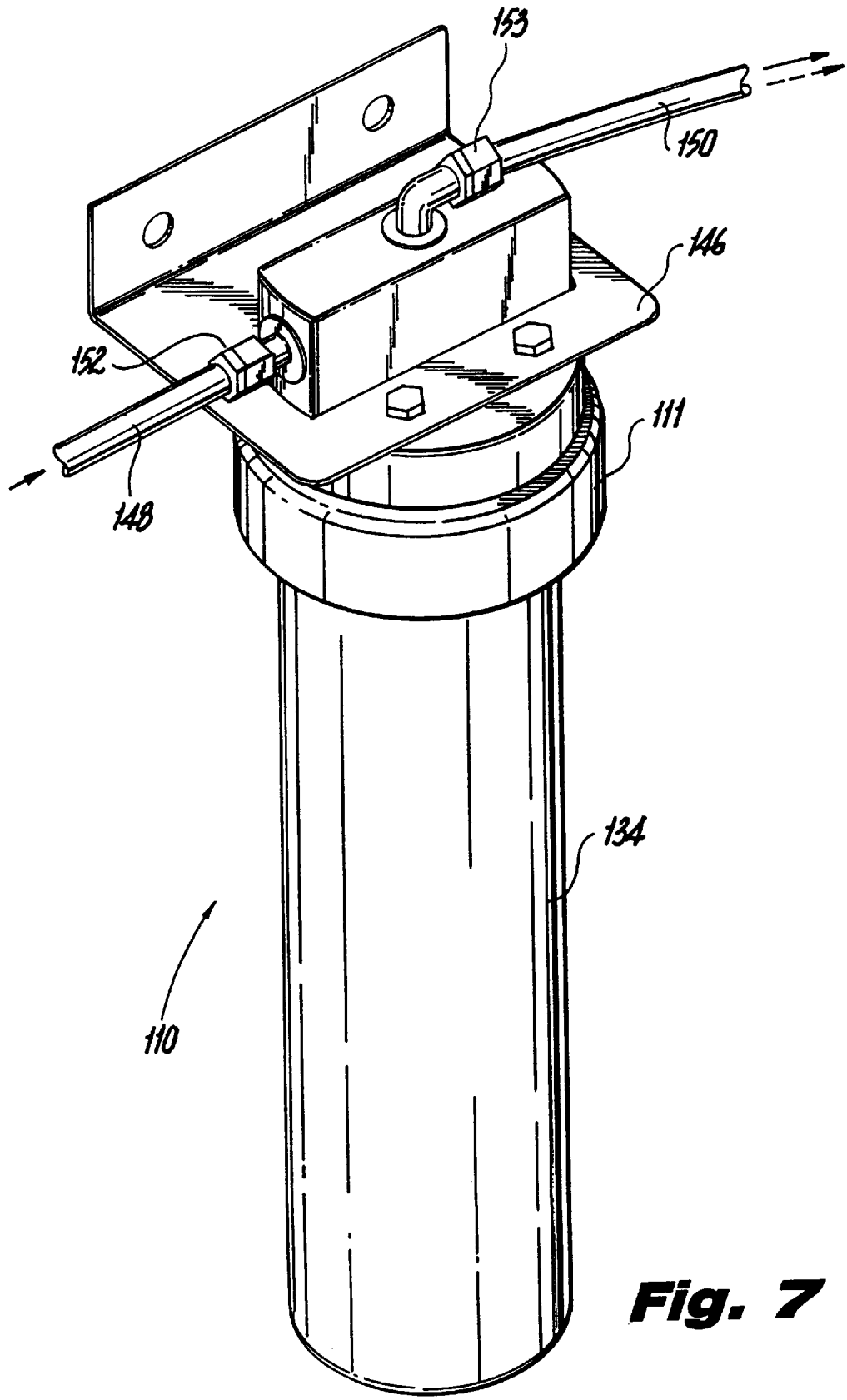
FIG. 7 is a perspective view of another additive dispensing apparatus constructed in accordance with a preferred embodiment of the subject invention.
Figure 8:
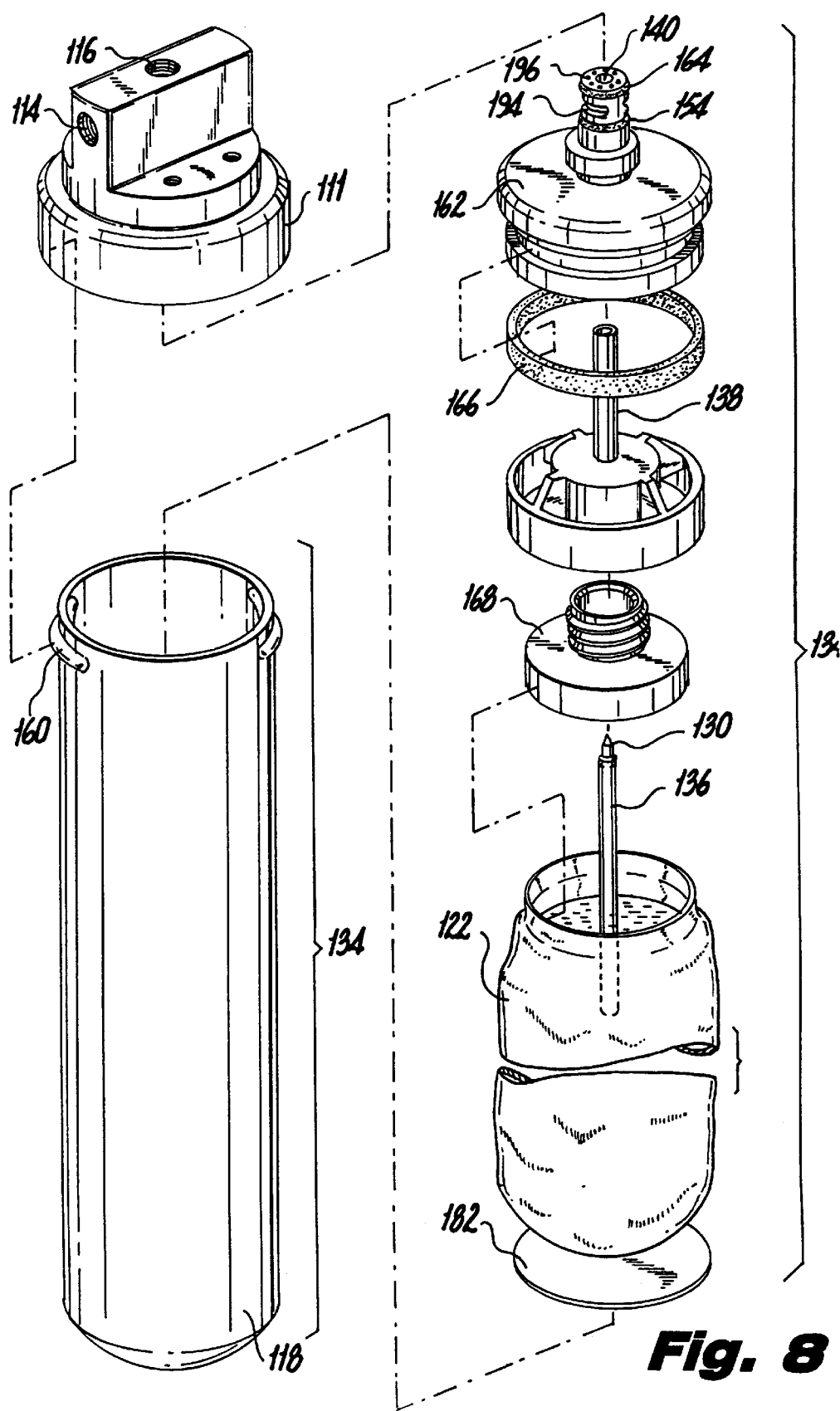
FIG. 8 is an exploded perspective view of the apparatus of FIG. 7 with the parts separated for ease of illustration.
Figure 9:
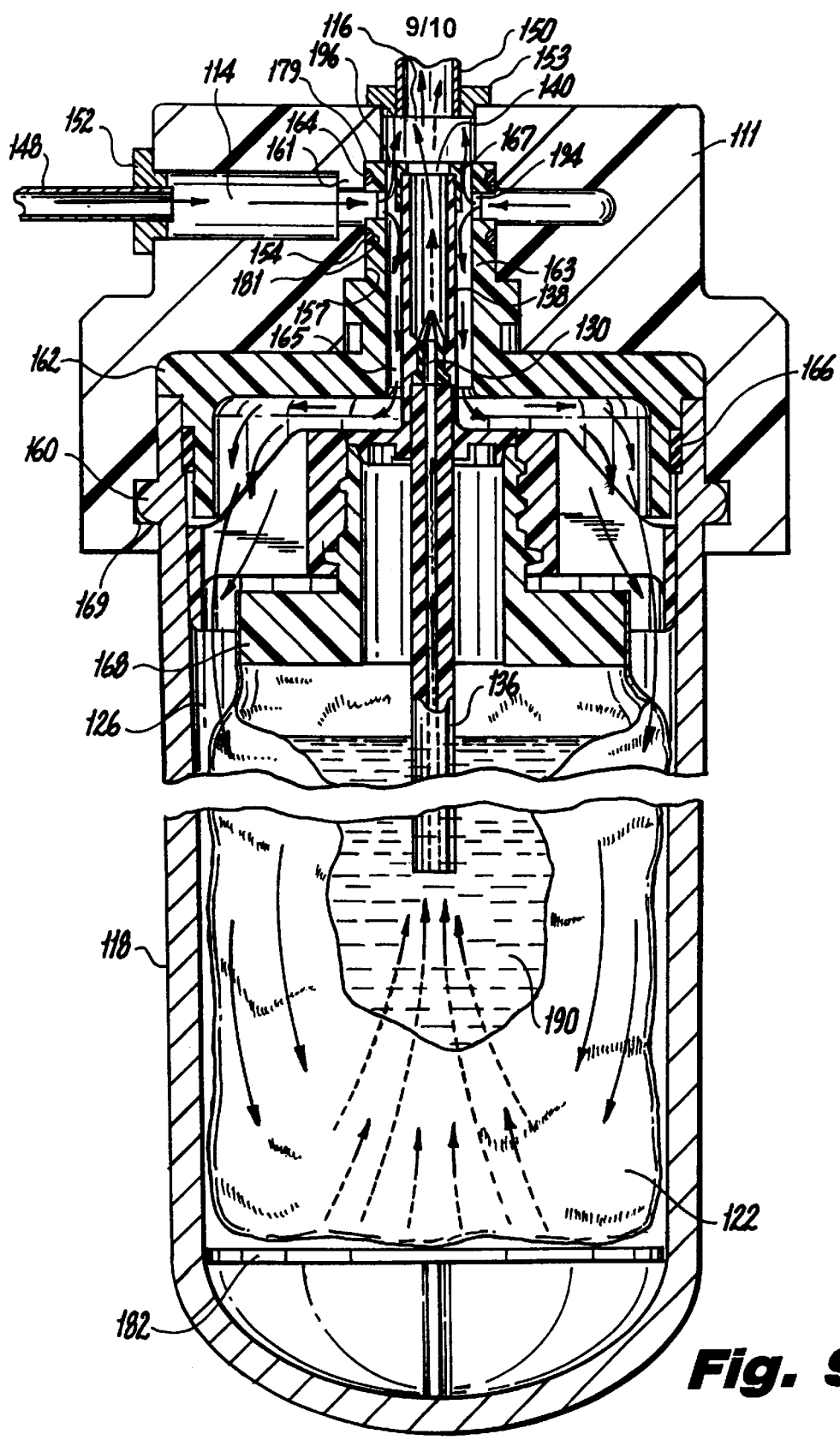
FIG. 9 is a side elevational view in cross-section of the apparatus shown in FIG. 7 illustrating the fluid flow path therethrough.

Referring now to FIGS. 7 through 9, another embodiment of the additive dispensing apparatus constructed in accordance with a preferred embodiment of the subject invention is illustrated and is described generally by reference numeral 110. A supporting bracket 146 is included for attachment to a supporting structure such as a wall or column.

Additive dispensing apparatus 110 includes a head body 111 and a detachable canister assembly 134. Inlet tube 148 is sealingly connected to a first tube connector 152 which is threaded to a first side wall of the head body 111 using tapered pipe threads. Similarly, an outlet tube 150 is sealingly connected to a second tube connector 153 which is threaded to a top surface of the head body 111 using tapered pipe threads. Extending partially up from and formed in a recess in the bottom surface of the head body 111 is a stepped smooth-bore cylindrical passageway 157 having side and top walls. Extending horizontally through the head body 111 is an inlet portion 114 that provides fluid communication between the first tube connector 152 and the side wall of the cylindrical passageway 157. A stepped shoulder 161 is formed in the inlet portion 114 to reduce its diameter as it intersects the cylindrical passageway 157. Extending vertically down from the top surface of the body 111 is an outlet portion 116 that provides fluid communication between the top surface of the body 111 and the top wall of the cylindrical passageway 157. The inlet portion 114, cylindrical passageway 157, and outlet portion 116 together form the flow path through the body 111. Two lobe shoulders 169 are formed in the walls of the bottom surface recess.

With continuing reference to FIG. 9, the detachable canister assembly 134 includes a rigid cylindrical container 118 fused to a rigid container cap 162 with a fusible weld ring 166. Extending from the top of the rigid container cap 162 is a cylindrical axial connector portion 163 having side and top walls. A cylindrical passageway 165 is formed concentrically within the axial connector portion 163 extending from the interior of the rigid container/cap assembly 118, 162 to the top wall of the axial connector portion. Fluid communication between the connector portion cylindrical passageway 165 and the exterior of the axial connector portion 163 is provided through two radially extending apertures 194 which pass through the side wall of the connector portion 163, a plurality of axially extending apertures 196 passing through the top wall of the connector portion 163, and a concentrically located axially extending feed tube aperture 140 which also passes through the top wall of the axial connector portion 163.

A first O-ring 164 is seated in a first radial groove 179 in the external wall of the axial connector portion 163 between the radially extending apertures 194 and connector portion top wall thereof. O-ring 164 prevents fluid flow between the inlet portion 114 and the outlet portion 116. A second O-ring 154 is seated in a second radial groove 181 in the external wall of the axial connector portion 163 just below the radially extending apertures 194. O-ring 154 ensures that fluid does not leak out of the fluid system. A concentrically located sleeve 167 is disposed adjacent the walls of the axially extending feed tube aperture 140 partially into the connector portion cylindrical passageway 165 for attachment of an upper feed-tube/collar 138. Two attachment lobes 160 are attached to the upper-outer periphery of the rigid container 118 and are engagable with the lobe shoulders 169 to allow attachment of the detachable canister 134 to the head body 111.

Enclosed within the rigid container/cap assembly 118, 162 is a collapsible container 122. A male-threaded adapter 168 is sealed within the upper edge of the collapsible bag to provide an attachment fitting. A lower feed tube 136 is press fit into the upper feedtube/collar 138 wherebetween a duckbill-type check valve 130 is trapped. The duckbill-type check valve 130 is oriented so that flow may progress only up through the lower feed tube 136 and upper feed-tube/collar 138 during operation. The upper feed-tube/collar 138, having female threads, is sealingly threaded to the adapter 168. The upper end of the upper feed-tube/collar 138 is press fit into the concentric sleeve 167. A collapsible container support plate 182 is located in the base of the rigid cylindrical container 118 interior to provide support for the collapsible container 122.

Referring now to FIG. 9, in operation liquid additive 190 is dispensed into a fluid system in the following manner. Fluid flows from the inlet tube 148 and into the inlet port 114 of the head body 111. The fluid then passes through the radially extending apertures 194 in the side wall of the axial connector portion 163 into the interior region 126 of the detachable canister 134. Fluid then travels through the plurality of axially extending apertures 196 in the top wall of the axial connector portion 163 and into the outlet portion 116 of the body 111. Liquid additive 190 is dispensed into the fluid flow utilizing differential pressure between the fluid in the interior region 126 of the canister 134 and the additive in the collapsible container 122 in the same manner described above for dispensement of additive in the preferred embodiment of the subject invention. The treated fluid then flows from the outlet portion 116 into the outlet tube 150 of the fluid system.

Figure 10:
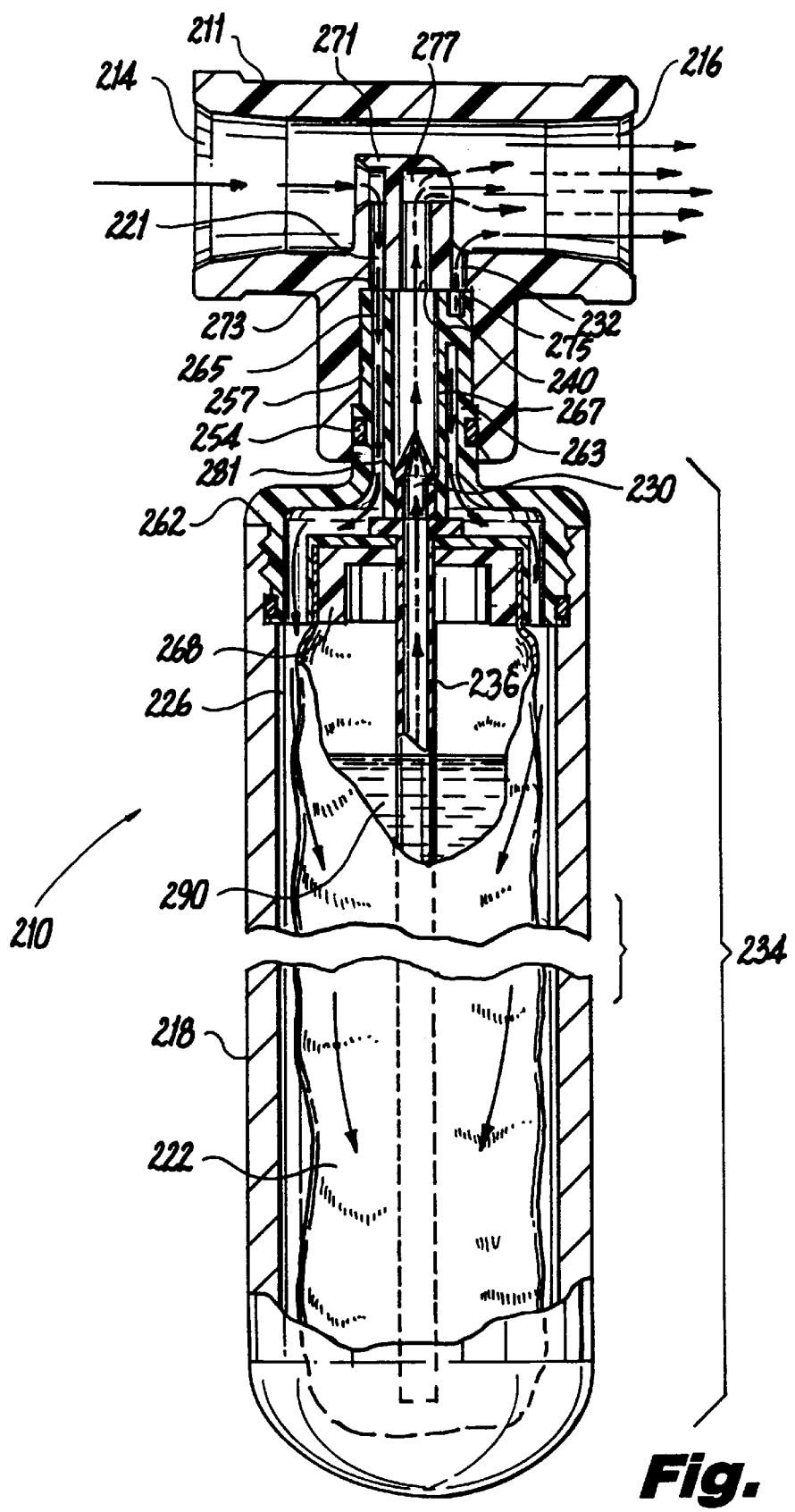
FIG. 10 is a side elevational view in cross-section of yet another additive dispensing apparatus constructed in accordance with a preferred embodiment of the subject invention.

Referring now to FIG. 10, yet another embodiment of the additive dispensing apparatus constructed in accordance with a preferred embodiment of the subject invention is illustrated and is designated generally by reference numeral 210. This alternate embodiment of the additive dispensing apparatus 210 includes a head body 211 and a detachable canister assembly 234.

Extending horizontally through the head body 211 is a first flow path having a fluid inlet portion 214 and a fluid outlet portion 216. Extending partially up from the bottom surface of the head body 211 is a stepped smooth-bore cylindrical passageway 257 having side and top walls. A restriction 271 protrudes into the first flow path causing the fluid outlet portion 216 to be a relatively low pressure region in comparison to the fluid inlet portion 214. A second flow path 221 extends from the inlet portion 214 to the top wall of the cylindrical passageway 257. A feed tube passageway 277 extends from the top wall of the cylindrical passageway 257 to the outlet portion 216. A third flow path 232 extends from the top wall of the cylindrical passageway 257 to the outlet portion 216.

With continuing reference to FIG. 10, the detachable canister assembly 234 includes a rigid cylindrical container 218 sealingly threaded to a rigid container cap 262. Extending from the top of the rigid container cap 262 is a cylindrical axial connector portion 263 having side and top walls. A cylindrical passageway 265 is formed concentrically within the axial connector portion 263 extending from the interior of the rigid container/cap assembly 218, 262 to the top wall of the axial connector portion 263. Fluid communication between the connector portion cylindrical passageway 265 and the exterior of the top wall of the axial connector portion 263 is provided through a first and second axial extending path 273, 275 and a concentrically located axially extending feed tube aperture 240.

A second O-ring 254 is seated in a second radial groove 281 in the lower external wall of the connector portion 263. O-ring 254 ensures that fluid does not leak out of the fluid system. A concentrically located sleeve 267 is disposed adjacent the walls of the axially extending feed tube aperture 240 the length of the connector portion cylindrical passageway 265 for attachment of a lower feed tube 236. When the detachable container 234 is properly installed into the head body 211, first axial extending path 273 is aligned with the second flow path 221, second axial extending path 275 is aligned with the third flow path 232, and feed tube outlet 240 is aligned with the feed tube passageway 277.

Enclosed within the rigid container/cap assembly 218, 262 is a collapsible container 222. An adapter 268 is sealed within the upper edge of the collapsible bag to provide an attachment fitting. The lower feed tube 236 is press fit into the concentrically located sleeve 267 trapping a duckbill-type check valve 230 therebetween. The check valve 230 is oriented so that flow may progress only up through the assembly during operation. The lower feed tube 236 is press fit into the adapter 268. Liquid additive 290 fills the collapsible container bag.

Liquid additive 290 is dispensed into a fluid system in the following manner. Fluid flows from the fluid system into the inlet portion 214 of the head body 211. The fluid then divides, partially continuing past the restricter 271 to the outlet portion and partially passing into the second flow path 221. The fluid flowing into the second flow path 221 travels through the first axial extending path 273 and then into the interior region 226 of the detachable canister 234 by way of the cylindrical passageway 265. Fluid then flows through the second axial extending path 275 by way of the cylindrical pathway 265, through the third flow path 232, and into the outlet portion 216 of the head body 211.

Fluid then passes into the fluid system. Because the feed tube passageway 277 is in communication with the relatively low pressure outlet portion 216, a differential pressure exists between the interior region 226 of the canister 234 and the liquid additive inside the collapsible container 222. Additive is therefore dispensed from the collapsible container 222; through the lower feed tube 236; the duckbill-type valve 230; the concentrically located sleeve 267; the feed tube outlet and passageway 240, 277; into the outlet portion 216; and to the fluid system.

While the invention has been described with respect to a preferred embodiment, those skilled in the art will readily appreciate that various changes and/or modifications can be made to the invention without departing from the spirit or scope of the invention as defined by the appended claims.

What is claimed is:

1. An additive dispensing apparatus for a fluid system comprising:
   a) a head having a body portion adapted and configured for fluid communication with the fluid system and having a flow path extending therethrough;
   b) a fluid inlet portion of said flow path defining a relatively high pressure region, and a fluid outlet portion of said flow path defining at least in part a relatively low pressure region;
   c) a canister operatively associated with said body portion and having an interior region;
   d) a fluid passageway providing fluid communication between said fluid inlet portion and said interior region of said canister;
   e) a collapsible container disposed within said interior region of said canister and having an interior region for containing liquid additive for dispensement into the fluid system; and
   f) at least one elongated feed tube providing fluid communication between said collapsible container and said fluid outlet portion, whereby the differential pressure between said interior region of said canister and said interior region of said collapsible container effectuates a proportional dispensement of liquid additive into the fluid system.

2. An additive dispensing apparatus as recited in claim 1, wherein said canister includes an elongated enclosure having opposed top and bottom ends and an end cap provided at said top end, said end cap having an axial connector portion provided thereon.

3. An additive dispensing apparatus as recited in claim 2, further comprising at least one tab on one of said body portion and said axial connector portion and a complementary keyed portion on one of said body portion and said axial connector portion for releasably receiving said at least one tab.

4. An additive dispensing apparatus as recited in claim 2, further comprising a latching groove formed in said end cap and a latch operatively attached to said body portion for releasably engaging said latching groove to maintain said end cap in a predetermined operating position.

5. An additive dispensing apparatus as recited in claim 2, further comprising a plurality of axially extending apertures formed in said connector portion between said interior region of said canister and said fluid outlet portion.

6. An additive dispensing apparatus as recited in claim 2, wherein said fluid passageway providing fluid communication between said fluid inlet portion and said interior region of said canister includes at least one radially extending aperture formed in said axial connector portion.

7. An additive dispensing apparatus as recited in claim 1, wherein said at least one elongated feed tube includes an upper feed tube and a lower feed tube.

8. An additive dispensing apparatus as recited in claim 1, further comprising a check valve operatively associated with said at least one elongated feed tube to control the dispensement of additive therethrough.

9. An additive dispensing apparatus as recited in claim 8, wherein said check valve is defined by a duckbill-type check valve.

10. An additive dispensing apparatus for a fluid system comprising
   a) a head having a body portion adapted and configured for fluid communication with the fluid system and having a first flow path extending therethrough;
   b) a fluid inlet portion of said first flow path defining a relatively high pressure region and a fluid outlet portion of said first flow path defining at least in part a relatively low pressure region;
   c) a canister operatively associated with said body portion and having an interior region;
   d) a second flow path providing fluid communication between said inlet portion of said first flow path and said interior region of said canister;
   e) a collapsible container disposed within said interior region of said canister and having an interior region for containing liquid additive for dispensement into the fluid system; and
   f) a feed tube providing fluid communication between said collapsible container and said fluid outlet portion, whereby the pressure differential between said interior region of said canister and said interior region of said collapsible container effectuates proportional dispensement of liquid additive into the fluid system.

11. An additive dispensing apparatus as recited in claim 10, wherein said canister includes an elongated enclosure having opposed top and bottom ends and an end cap provided at said top end, said end cap having an axial connector portion provided thereon.

12. An additive dispensing apparatus as recited in claim 10, further comprising a third flow path providing fluid communication between said interior of said canister and said fluid outlet portion.

13. An additive dispensing apparatus as recited in claim 10, wherein said feed tube includes an upper feed tube portion and a lower feed tube portion.

14. An additive dispensing apparatus as recited in claim 10, further comprising a check valve operatively associated with said feed tube for controlling the dispensement of additive therethrough.

15. An additive dispensing apparatus as recited in claim 14, wherein said check valve is defined by a duckbill-type check valve.

16. A fluid system comprising:
   a) at least one conduit for transmitting fluid;
   b) an additive dispensing apparatus including:
      i) a body portion adapted and configured for fluid communication with said fluid system and having a flow path extending therethrough, said flow path including a fluid inlet portion defining a relatively high pressure region and a fluid outlet portion defining at least in part a relatively low pressure region;
      ii) a canister operatively associated with said body portion and having an interior region;
      iii) a first fluid passageway providing fluid communication between said fluid inlet portion and said interior region of said canister;
      iv) a collapsible container disposed within said interior region of said canister and having an interior region for containing liquid additive for dispensement into the fluid system; and
      v) at least one elongated feed tube providing fluid communication between said interior region of said collapsible container and said fluid outlet portion;
   c) a manifold providing fluid communication between said at least one conduit and said fluid inlet portion and between said fluid outlet portion and said at least one conduit; and
   d) a flow restriction between said inlet portion and said outlet portion for establishing said relatively high pressure region within said inlet portion and said relatively low pressure region within said outlet portion,
   whereby the differential pressure between said interior region of said canister and said interior region of said collapsible container effectuates a proportional dispensement of liquid additive into the fluid system.

17. An additive dispensing apparatus as recited in claim 16, further comprising a second fluid passageway between said interior region of said canister and said fluid outlet portion.

18. A fluid system as recited in claim 16, wherein said manifold further comprises an in line filter attachment and a filter cartridge operatively attached to said filter attachment for permitting filtration of fluid as it passes through the fluid system.

19. An additive dispensing apparatus for a fluid system comprising:
   a) a head having a body portion adapted and configured for fluid communication with the fluid system and having a flow path extending therethrough;
   b) a fluid inlet portion of said flow path defining a relatively high pressure region, and a fluid outlet portion of said flow path defining at least in part a relatively low pressure region;
   c) a canister, operatively associated with said body portion, having an interior region and opposed top and bottom ends;

d) an end cap provided at said top end of said canister and having an axial connector portion provided thereon;

e) at least one radially extending aperture formed in said axial connector portion for providing fluid communication between said fluid inlet portion and said interior region of said canister;

f) a plurality of axially extending apertures formed in said axial connector portion for providing fluid communication between said interior region of said canister and said fluid outlet portion;

g) a collapsible container disposed within said interior region of said canister and having an interior region for containing liquid additive for dispensement into the fluid system; and h) an elongated feed tube disposed between said collapsible container and said fluid outlet portion for providing fluid communication therebetween, whereby the differential pressure between said interior region of said canister and said interior region of said collapsible container effectuates a proportional dispensement of liquid additive into the fluid system.

20. An additive dispensing apparatus for use in conjunction with a fluid system including a head defining a fluid flow path having at least in part a relatively high pressure region and a relatively low pressure region, and an enclosure in fluid communication with said relatively high pressure region and defining an interior region, the apparatus comprising:

a) a collapsible container disposed within the interior region of the enclosure and having an interior region for containing liquid additive for dispensement into the fluid system;

b) at least one elongated feed tube for facilitating fluid communication between said collapsible container and said relatively low pressure region; and c) a check valve operatively associated with said collapsible container for controlling the flow of liquid additive from said collapsible container.

21. An additive dispensing apparatus as recited in claim 20, wherein the enclosure includes opposed top and bottom ends and an end cap provided at said top end, said end cap having an axial connector portion provided thereon.

22. An additive dispensing apparatus as recited in claim 20, wherein said enclosure is detachable from said head for providing access to said enclosure interior to permit removal of said collapsible container.

23. An additive dispensing apparatus as recited in claim 22, wherein a male threaded portion is formed on one of said head and said enclosure and a female threaded portion is formed on one of said head and said enclosure.

24. An additive dispensing apparatus as recited in claim 22, wherein an attachment lobe is formed in one of said head and said enclosure and a lobe shoulder formed in one of said head and said enclosure.

25. An additive dispensing apparatus as recited in claim 20, further including a removable mating collar permitting said collapsible container to be refilled.

26. An additive dispensing apparatus as recited in claim 21, further comprising at least one tab on one of said head and said axial connector portion and a complementary keyed portion on one of said head and said axial connector portion for releasably receiving said at least one tab.

* * * * *